United States Patent [19]

Delzio

[11] Patent Number: 5,113,795
[45] Date of Patent: May 19, 1992

[54] CAT SCRATCHING POST FEEDER

[76] Inventor: Robert J. Delzio, P.O. Box 600251, San Diego, Calif. 92160

[21] Appl. No.: 680,933

[22] Filed: Apr. 5, 1991

Related U.S. Application Data

[63] Continuation-in-part of Ser. No. 549,921, Jul. 9, 1990, abandoned.

[51] Int. Cl.⁵ ............................................. A01K 1/10
[52] U.S. Cl. ................................. 119/51.01; 119/54; 119/29
[58] Field of Search ................. 119/51.01, 29, 53.5, 119/54, 70

[56] References Cited

U.S. PATENT DOCUMENTS

| | | | |
|---|---|---|---|
| 1,309,090 | 7/1919 | Henson | 119/54 |
| 2,997,019 | 8/1961 | Bryson | 119/29 |
| 3,604,397 | 9/1971 | Salerno | 119/29 |
| 4,177,763 | 12/1979 | Cook | 119/29 |
| 4,676,197 | 6/1987 | Hoover | 119/54 X |

Primary Examiner—Robert P. Swiatek
Assistant Examiner—Nicholas D. Lucchesi

[57] ABSTRACT

A cat scratching post feeder comprising a dry food filled inner cylinder with a spring-loaded lower lid, and a carpeted outer cylinder that slides over the inner cylinder and rests upon the inner cylinder's lower lid steel support rod. The carpeted outer cylinder rests directly upon the lower lid's protruding steel support rod. Scratching action of a cat upon the carpeted outer cylinder exerts downward force through the steel support rod to the spring-loaded lower lid causing the lower lid to open and dispense dry cat food. The cat scratching post feeder can be mounted to a fixed wall or mounted to a free standing base. The cat scratching post feeder is a dual function device acting as a scratching post and as a pet-activated feeder.

3 Claims, 8 Drawing Sheets

CAT SCRATCHING POST FEEDER

CONTINUATION IN PART

This application is a continuation in part of pending U.S. patent application Ser. No. 07/549,921, filed Jul. 9, 1990 now abondoned.

BACKGROUND OF THE INVENTION

Cat scratching posts have been in existence for many years. Ideally, a scratching post is used exclusively by a cat to sharpen its claws, thereby preserving valuable furniture, carpeting, and garments which would otherwise be the likely target of the cat. However, convincing a cat to sharpen its claws on the scratching post has always been a most difficult task.

The cat scratching post feeder, the invention disclosed herein, is designed to provide the cat with the necessary incentive to use a scratching post. Any scratching motion by a cat upon the cat scratching post feeder will automatically release dry cat food as an incentive or reward for the cat.

Mechanical feeders for animals do exist. One such apparatus is shown in U.S. Pat. No. 4,676,197. In this apparatus, the intent is to feed hogs and like animals on a programmed basis. The cited invention relates generally to animal husbandry.

Scratching posts for cats also exist. Examples are shown in U.S. Pat. Nos. 2,997,019; 3,604,397; and 4,177,763. However, to date, no device has existed as the herein disclosed cat scratching post feeder. This invention serves a unique dual function; cat scratching post and simultaneous pet-activated feeder.

OBJECTS AND SUMMARY OF THE INVENTION

An object of this invention is to provide a cat scratching post with an effective incentive for actual use by cats. That incentive is the delivery of dry food to the cat in recognition of the cat's use of the scratching post.

This invention, the cat scratching post feeder, provides a much higher probability of actual use of the scratching post, by cats, as compared to prior art units which offer solely a scratching surface for the cat without any added incentive.

A further object of this invention is to provide a self-feeding apparatus for cats. The dry food storage section of the cat scratching post can hold up to seven days supply of dry food.

DETAILED DESCRIPTION OF THE PREFERRED EMBODIMENT

Referring in more detail to the drawings, there is shown the inner cylinder 1 with the lower lid 3 attached to the inner cylinder 1 by two plastic cable ties 4 forming a hinging mechanism. Also attached between the inner cylinder 1 and the lower lid 3, by means of two riveted hooks 6, is one extension spring 5.

Figure 7:
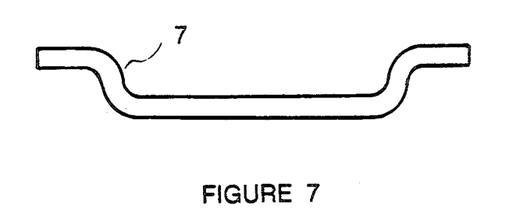
FIG. 7 is the front view of the steel support rod which is riveted to the underside of the inner cylinder lower lid.
Figure 8:
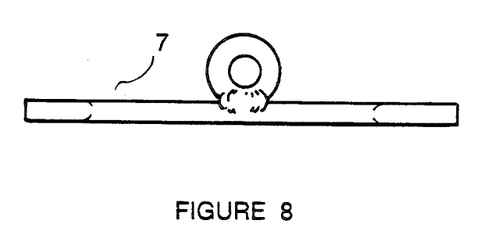
FIG. 8 is the top view of the steel support rod which is riveted to the underside of the inner cylinder lower lid.
Figure 9:
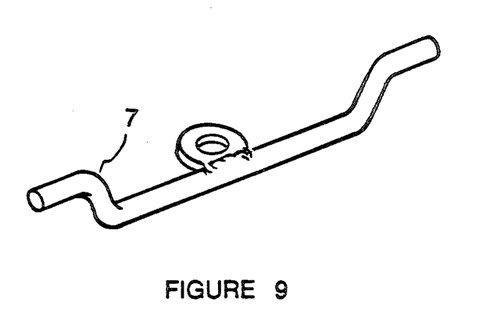
FIG. 9 is the isometric view of the steel support rod which is riveted to the underside of the inner cylinder lower lid.

Riveted to the underside of the hinged, spring loaded lower lid 3 is the steel support rod 7. It is a steel rod with a weld-attached metal washer for single rivet fastening to the underside of the inner cylinder's lower lid 3, and is shaped with upward and outward bends at each of its two ends so as to follow the contour of the underside and sides of the lower lid 3 and protrude outward from the lower lid 3 thereby supporting the carpeted outer cylinder 13. Refer to FIGS. 7, 8, and 9 for detailed rendering of the steel support rod 7.

The invention, the cat scratching post feeder, can be mounted in one of two ways; wall mount and free standing. Both mounting methods require that the inner cylinder 1 first be securely mounted. Then, the carpeted outer cylinder 13 can be easily slid over the stationary inner cylinder 1.

Wall mounted

Figure 2:
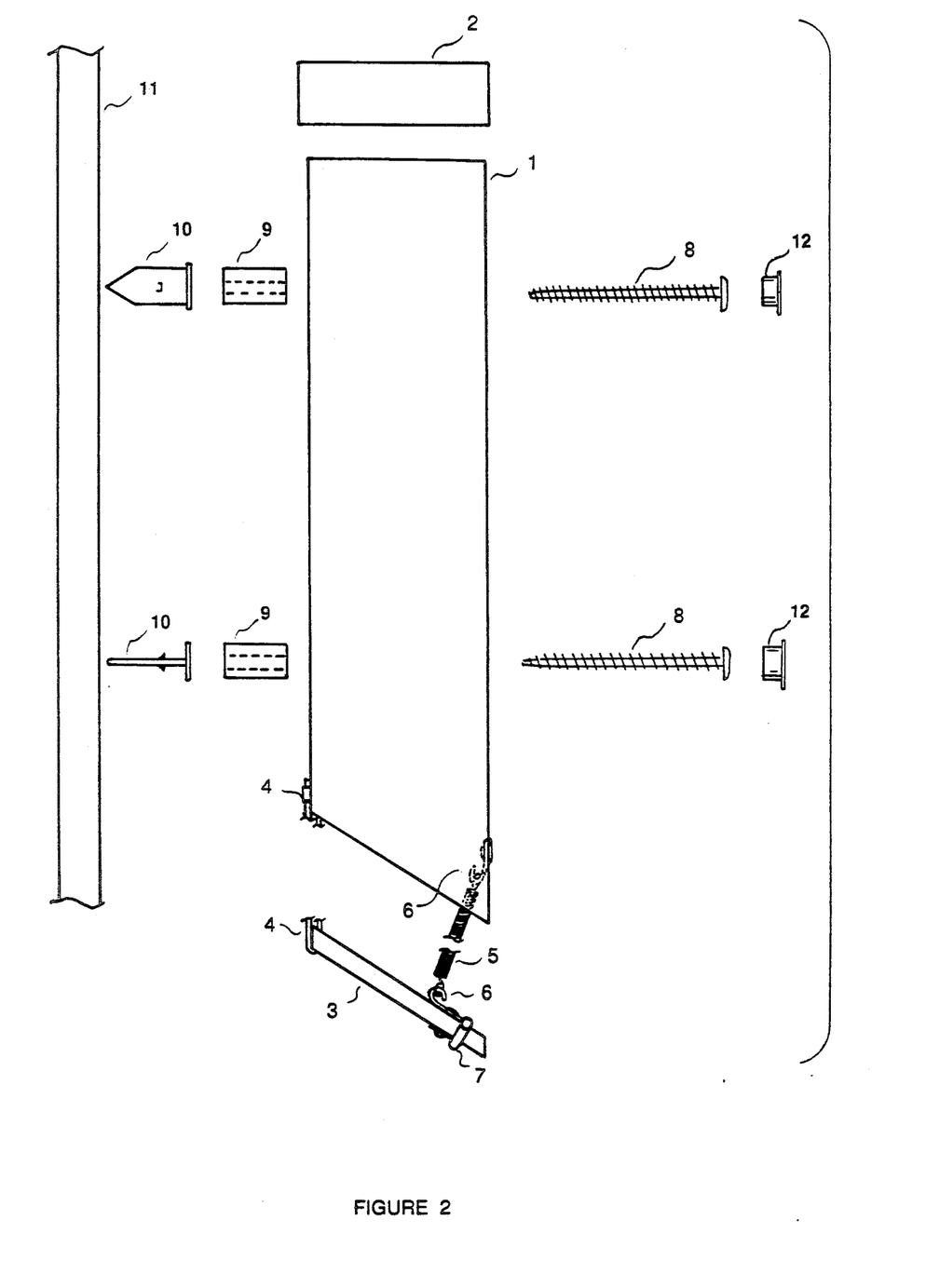
FIG. 2 is an exploded right side view of the inner cylinder structure of the invention, showing wood screws, plastic spacers, and wall anchors for wall mounting.
Figure 3:
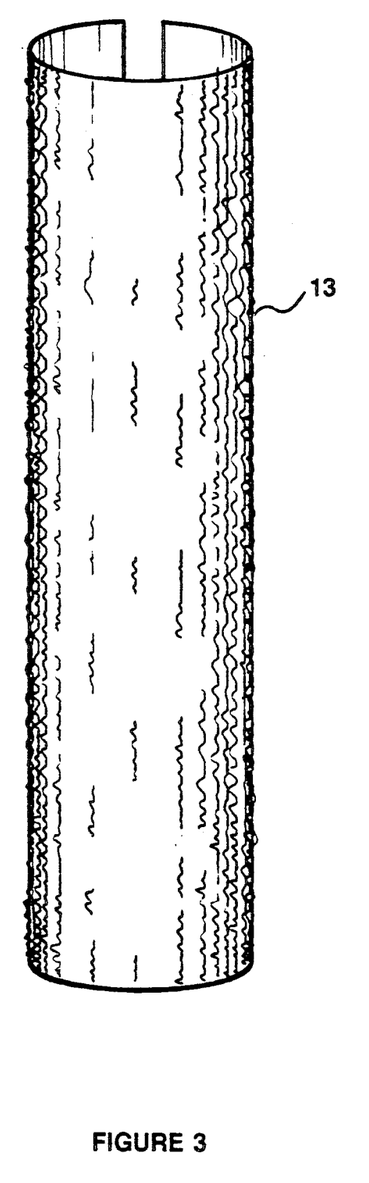
FIG. 3 is the front view of the carpeted outer cylinder structure of the invention.
Figure 4:
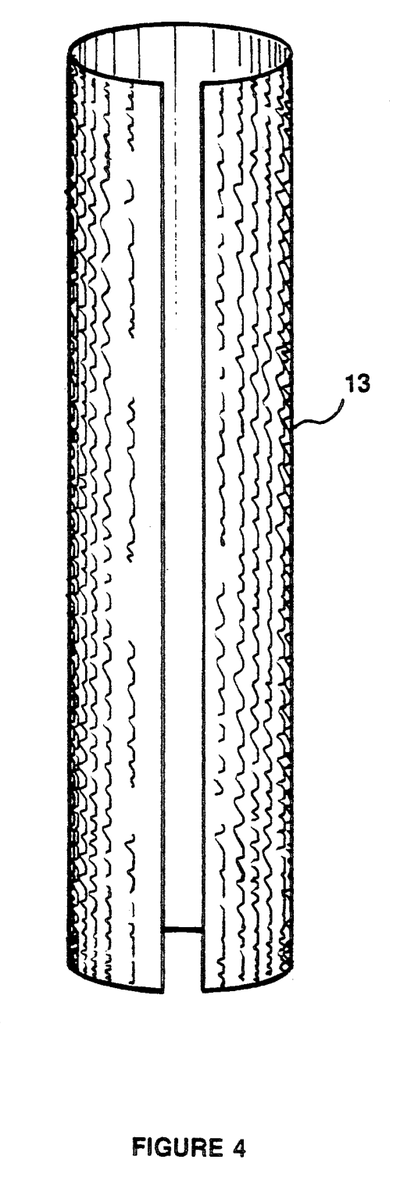
FIG. 4 is the back view of the carpeted outer cylinder structure of the invention.
Figure 5:
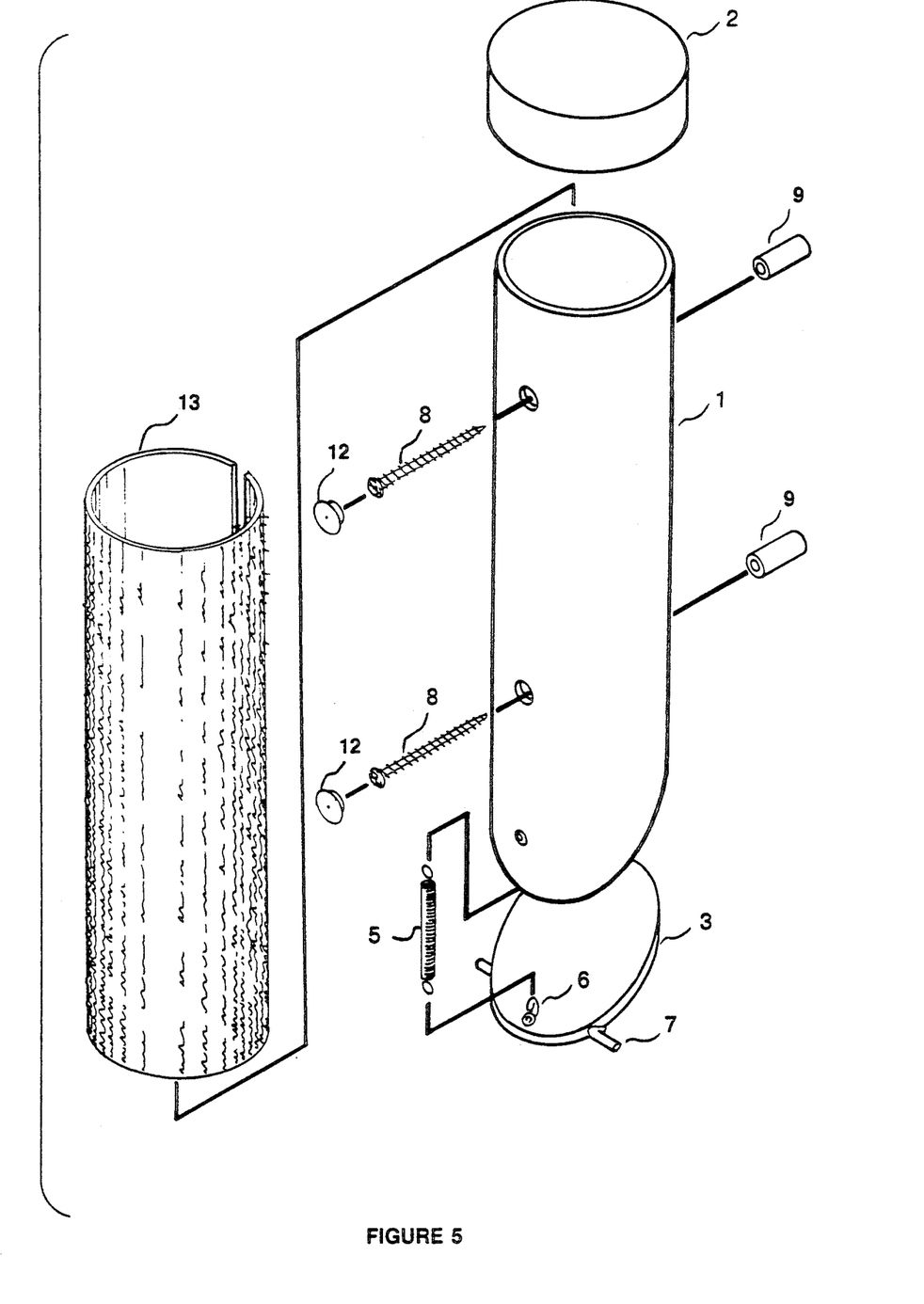
FIG. 5 is the exploded isometric view of the complete scratching post feeder prior to mounting.
Figure 6:
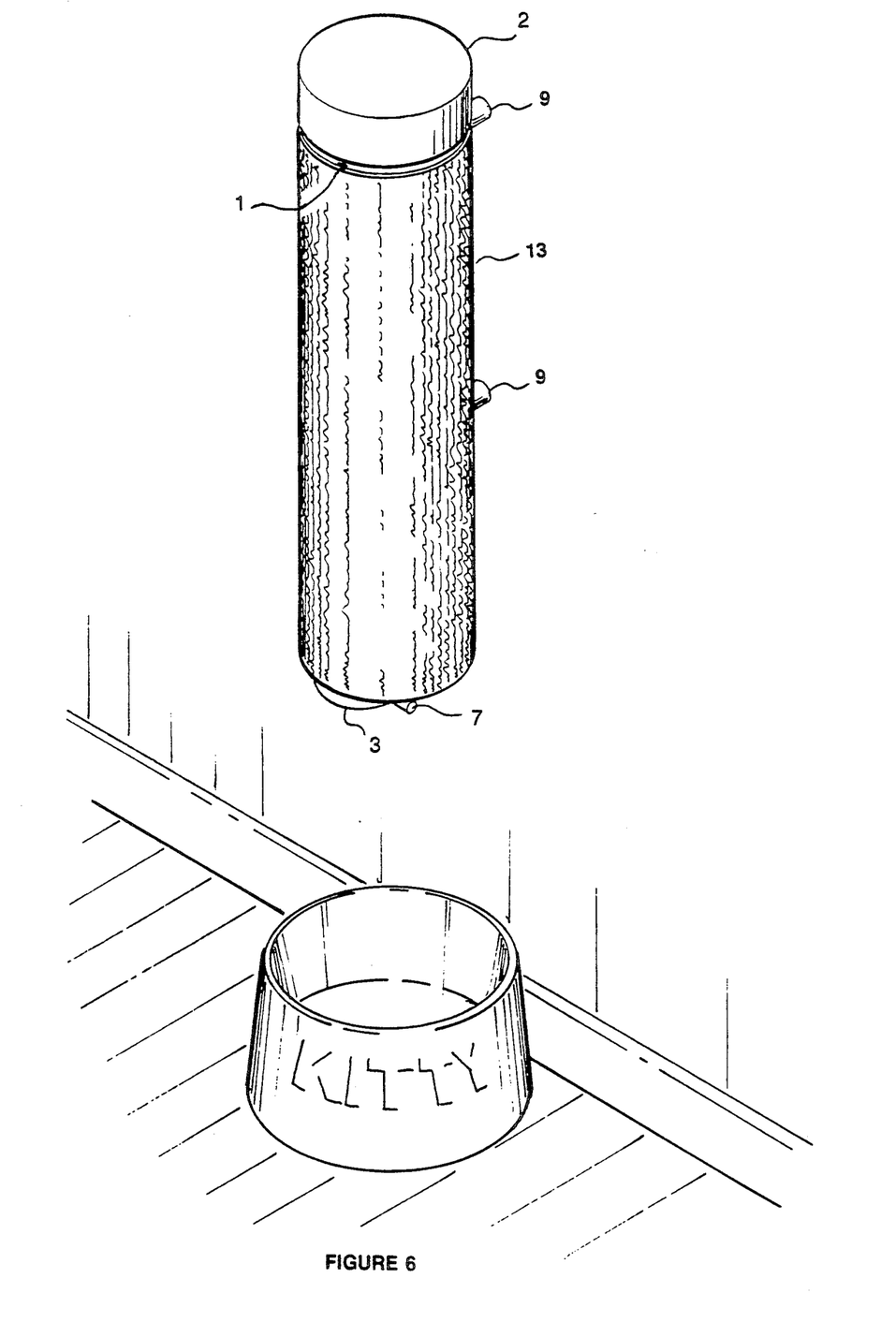
FIG. 6 is the isometric view of the complete and assembled scratching post feeder mounted to a wall.

The inner cylinder 1 is secured to a wall 11 (see FIGS. 2, 5, 6). The two hollow wall anchors 10 are required when mounting to a hollow wall. That is, a wall in which the framing studs cannot be located or utilized. The two plastic spacers 9 are used to maintain a fixed distance between the wall 11 and the inner cylinder 1. This spacing is required so that the carpeted outer cylinder 13 can slide over the secured inner cylinder 1. The two wood screws 8 slide through pre-drilled holes of the inner cylinder 1 and on through the two plastic spacers 9 and into the wall 11.

Figure 1:
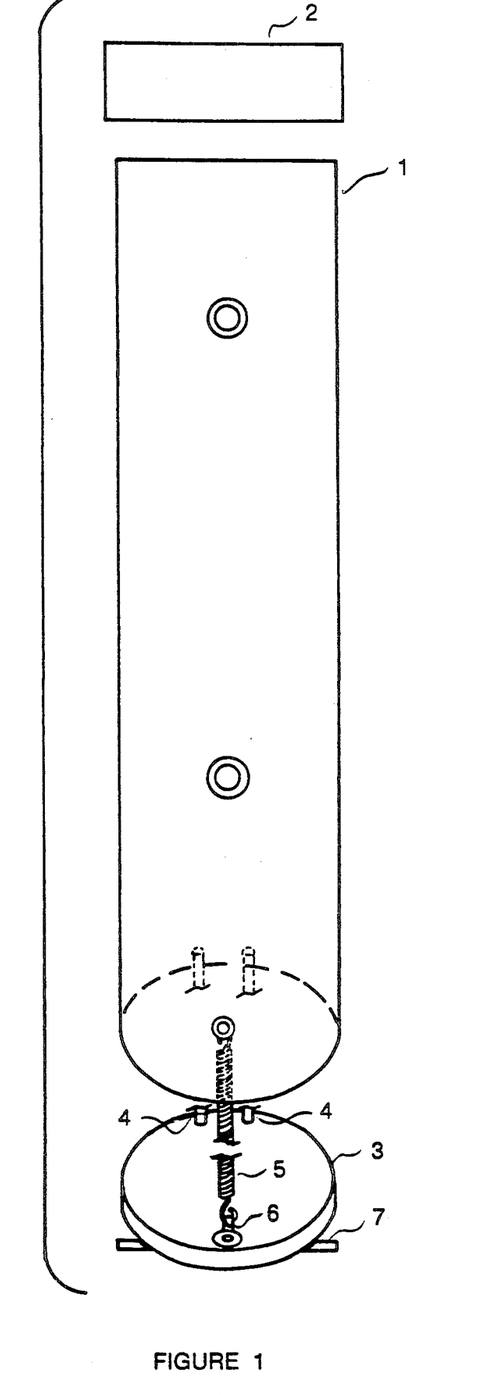
FIG. 1 is an exploded front view of the inner cylinder structure of the invention.

FIG. 1 shows the pre-drilled holes in a front view of the inner cylinder 1, with larger 0.5 inche diameter holes in the front of cylinder 1, and smaller 0.25 inche diameter holes in the rear of cylinder 1, and coaxial with the larger holes.

The heads of the two wood screws 8 only pass through the larger 0.5-inch diameter pre-drilled holes of the inner cylinder 1 and rest against the inner cylinder's inside wall in line with the smaller 0.25-inch diameter pre-drilled holes. The two plastic plugs 12 seal the two larger 0.5-inch diameter pre-drilled holes of the inner cylinder 1.

Free standing

Figure 10:
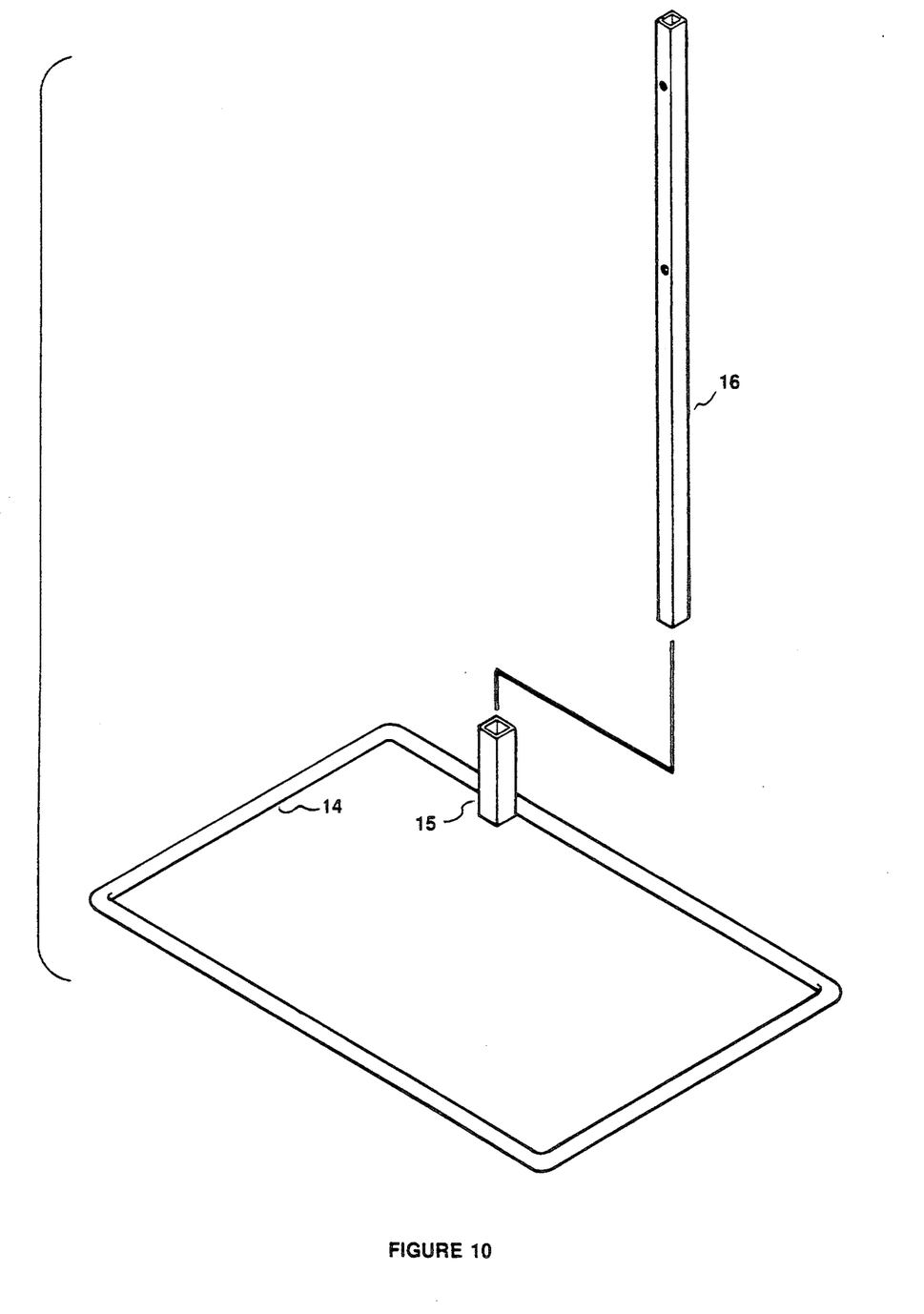
FIG. 10 is the exploded isometric view of the free standing base of the invention.
Figure 11:
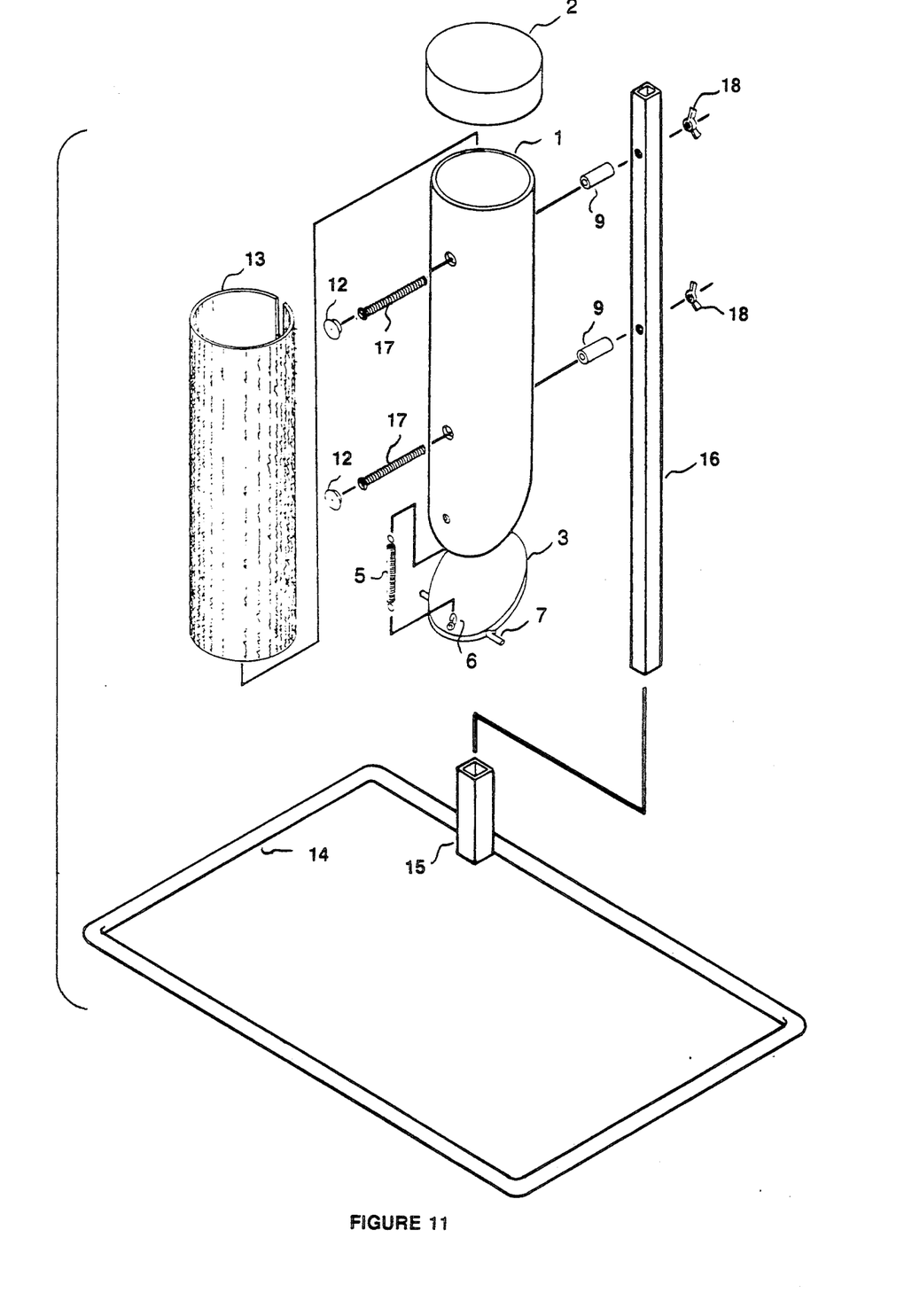
FIG. 11 is the exploded isometric view of the complete scratching post feeder mounted to the free standing base.

The inner cylinder 1 is secured to the vertical support square tubing 16 of the free standing base 14, 15, 16 (see FIGS. 10 and 11 showing the rectangular steel rod base 14 with weld-attached short vertical square tubing 15 and the vertical support square tubing 16), The two plactic spacers 9 are used to maintain a fixed distance between free standing base vertical support square tubing 16 and the inner cylinder 1. As with the wall mount version, this spacing is required so that the carpeted outer cylinder 13 can slide over the secured inner cylinder 1. The two threaded bolts 17 slide through pre-drilled holes of the inner cylinder 1 and on through the two plastic spacers 9 and finally through the vertical support square tube 16. The heads of the two threaded bolts 17 only pass through the larger 0.5-inch diameter pre-drilled holes of the inner cylinder 1 and rest against the inner cyliner's inside wall in line with the smaller 0.25-inch diameter pre-drilled holes. The two wingnuts 18 are screwed onto the two threaded bolts 17 securing the inner cylinder to the vertical support square tube 16. The two plastic plugs 12 seal the two larger 0.5-inch diameter pre-drilled holes of the inner cylinder 1.

The carpeted outer cylinder 13 (see FIGS. 3, 4, 5, 6, and 11), with its vertical slot or cut-out, slides over the mounted inner cylinder 1 and rests upon the steel support rod 7 of the inner cylinders's lower lid 3. Dry cat food is placed inside the inner cylinder 1. The installation of the invention, the cat scratching post feeder, is complete once the plastic cap 2 is placed over the inner cylinder 1.

Scratching action of a cat upon the carpeted outer cylinder 13 exerts downward force through the steel support rod 7 to the spring-loaded lower lid 3 causing the lower lid 3 to open and dispense dry cat food.

The invention, the cat scratching post feeder, is a dual function device: a scratching post and a pet-activated feeder.

While preferred embodiments of the present invention have been shown and described herein, it is obvious that many structural details may be changed without departing from the spirit and scope of the appended claims. For example, the two plastic cable ties 4, which act as a hinge between the inner cylinder 1 and the lower lid 3, might be replaced by a metal strap hinge.

I claim:

1. A cat scratching post feeder comprising a wall mountable dry food fillable inner cylinder with a spring-loaded hinged lower lid, a steel support rod attached to the bottom of the lower lid, and a carpeted outer cylinder that slides over the inner cylinder and rests upon the steel support rod thereby creating a dual function device, cat scratcher and pet-activated feeder, which will dispense dry cat food whenever a cat exerts downward force on the steel support rod by scratching the carpeted outer cylinder.

2. A cat scratching post feeder comprising a free-standing platform, with a weld-attached vertically positioned short length of hollow tubing into which slides a separate longer length of pre-drilled tubing, a dry food fillable inner cylinder with a spring-loaded, hinged lower lid, a steel support rod attached to the bottom of the lower lid, and a carpeted outer cylinder that slides over the inner cylinder and rests upon the steel support rod thereby creating a dual function device, a cat scratcher and pet-activated feeder, which will dispense dry cat food whenever a cat exerts downward force on the steel support rod by scratching the carpeted outer cylinder.

3. The cat scratching post feeder as set forth in claims 1 or 2 wherein: said steel support rod comprises a weld-attached metal washer for single rivet fastening to the underside of the inner cylinder's lower lid and said steel support rod is shaped with upward and outward bends at each of its two ends so as to follow the contour of the underside and sides of the lower lid and protrude outward from the lower lid at two opposing points thereby supporting the carpeted outer cylinder which rests upon the two ends of the steel support rod.

* * * * *